United States Patent [19]

Omae et al.

[11] Patent Number: 5,526,147
[45] Date of Patent: Jun. 11, 1996

[54] POLYMER DISPERSED LIQUID CRYSTAL PROJECTOR WITH DIFFRACTION GRATINGS ALONG LIQUID CRYSTAL ELECTRODES, A VARIABLE DIAPHRAGM, AND AN ANAMORPHIC LENS

[75] Inventors: Hideki Omae, Suita; Hiroshi Takahara, Neyagawa, both of Japan

[73] Assignee: Matsushita Electric Industrial Co., Ltd., Osaka-fu, Japan

[21] Appl. No.: 80,880

[22] Filed: Jun. 24, 1993

[30] Foreign Application Priority Data

Jun. 29, 1992 [JP] Japan .................................. 4-170409
Jun. 30, 1992 [JP] Japan .................................. 4-171383

[51] Int. Cl.⁶ .......................... G02F 1/1335; G02F 1/13
[52] U.S. Cl. ........................ 359/041; 359/40; 359/95
[58] Field of Search ............................ 359/40, 41, 51, 359/95

[56] References Cited

U.S. PATENT DOCUMENTS 4,389,096  6/1983  Hori et al. ............................... 359/72
4,435,047  3/1984  Fergason .................................. 359/51
4,729,640  3/1988  Sakata ..................................... 359/79
5,237,435  8/1993  Kurematsu et al. ..................... 359/41
5,299,289  3/1994  Omae et al. ............................. 359/51

FOREIGN PATENT DOCUMENTS 53-3928  2/1978  Japan .

*Primary Examiner*—Anita Pellman Gross
*Attorney, Agent, or Firm*—Wenderoth, Lind & Ponack

[57] ABSTRACT

A liquid crystal panel includes first and second substrates at least one of which has a light transmission property and which confront each other, first and second electrode layers which are formed on opposed faces of the first and second substrates, respectively, a polymer dispersion liquid crystal layer which is sandwiched between the first and second substrates, and a layer which is formed on at least one of the first and second electrode layers and has an uneven sectional shape so as to define concavities. At least liquid crystals disposed in the concavities of the layer are aligned in a predetermined direction.

12 Claims, 8 Drawing Sheets

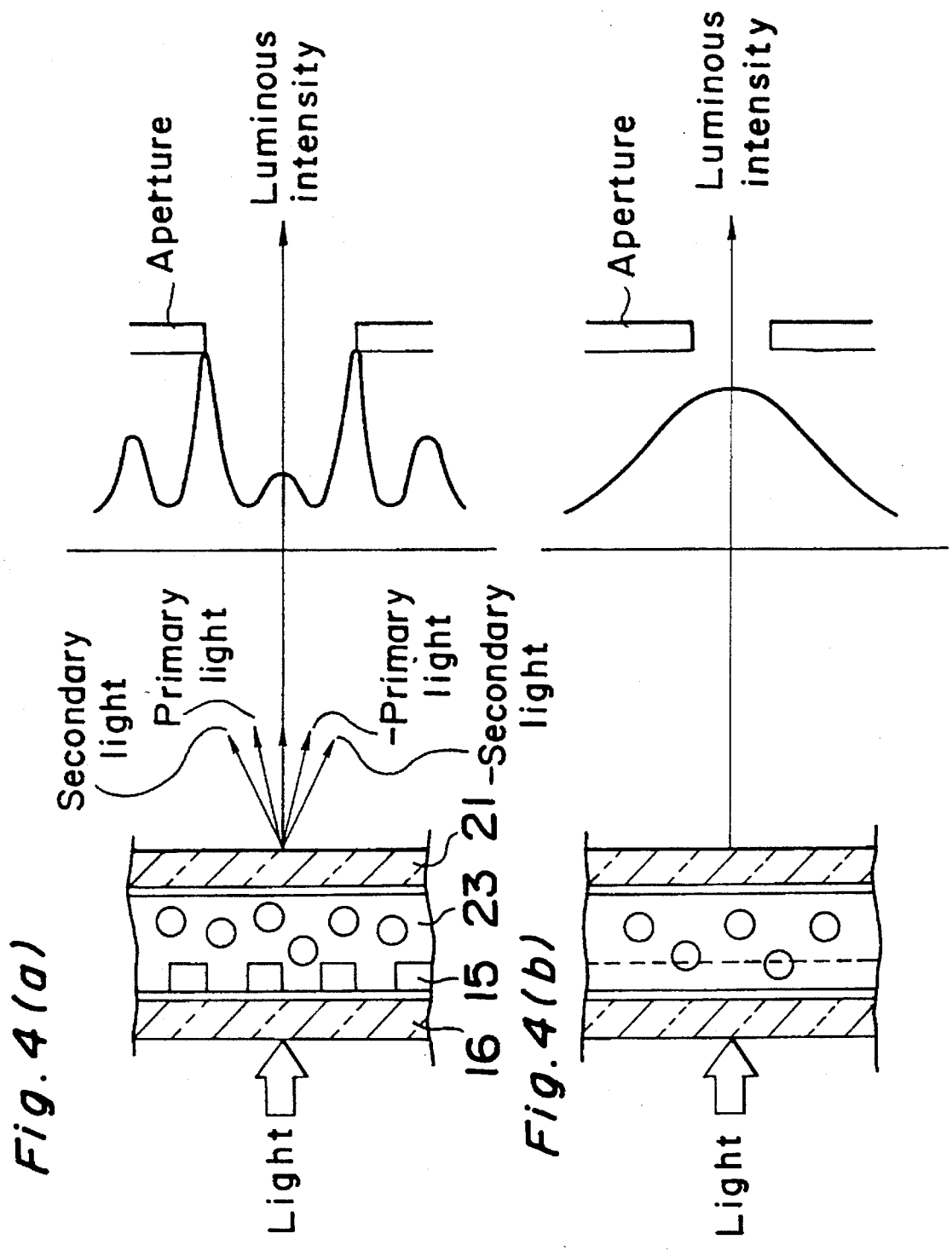

POLYMER DISPERSED LIQUID CRYSTAL PROJECTOR WITH DIFFRACTION GRATINGS ALONG LIQUID CRYSTAL ELECTRODES, A VARIABLE DIAPHRAGM, AND AN ANAMORPHIC LENS

BACKGROUND OF THE INVENTION

1. Field of the Invention

The present invention relates to a compact liquid crystal panel and a liquid crystal projector which employs the liquid crystal panel so as to project onto a screen at an enlarged scale, an image displayed on the liquid crystal panel.

2. Description of the Prior Art

Liquid crystal panels have a number of features such as being light weight and thin and thus, are under intensive research and development. However, the liquid crystal panels have also many problems. For example, it is difficult to enlarge image planes of the liquid crystal panels. Thus, in recent years, a liquid crystal projector that has increasingly attracted much attention is one in which an image displayed on a compact liquid crystal panel is projected onto a large screen at an enlarged scale by a projection lens or the like such that a large image is displayed on the screen. Liquid crystal projectors commercially available at present employ a twisted nematic (TN) liquid crystal panel based on optical rotation of liquid crystal.

Initially, a liquid crystal panel will be generally described. The TN liquid crystal panel as one example of known liquid crystal panels requires polarizers at its input and output sides, respectively so as to modulate light. The operation of the TN liquid crystal panel will be described briefly. When a light ray has passed through the input polarizer, the light ray is turned into unidirectional polarized light such that the polarized light is incident upon the liquid crystal panel. When the liquid crystal panel is in the OFF state the, direction of polarization of the incident light ray is rotated through 90° by optical rotation of liquid crystal molecules. On the contrary, when the liquid crystal panel is in the ON state, optical rotation of the liquid crystal molecules is eliminated and thus, the direction of polarization of the incident light ray does not change. Hence, if the directions of polarization of the input and output polarizers intersect with each other at right angles, the incident light ray is transmitted through the liquid crystal panel and intercepted when the liquid crystal panel is in the OFF state and ON state, respectively. Meanwhile, if the directions of polarization of the two polarizers are parallel to each other, the result is opposite, namely, the incident light ray is intercepted and transmitted through the liquid crystal panel when the liquid crystal panel is in the OFF state and ON state, respectively. The TN liquid crystal panel modulates light by turning on and off as described above so as to display an image.

Hereinbelow, a known liquid crystal projector is described. The known liquid crystal projector includes a light emitting means such as a converging optical system or the like, an ultraviolet cutting mirror for transmitting ultraviolet light therethrough, a blue dichroic mirror for reflecting blue light (referred to as a "BDM", hereinbelow), a green dichroic mirror for reflecting green light (referred to as a "GDM", hereinbelow), a red dichroic mirror for reflecting red light (referred to as a "RDM", hereinbelow), optical elements such as projection lens systems, etc. used for the blue light, green light and red light, respectively, three pairs of input and output polarizers used for the blue light, green light and red light, respectively and conventional transmission type TN liquid crystal panels for the respective pairs of the input and output polarizers.

The known liquid crystal projector operates as follows. Initially, when white light is emitted from the converging optical system, blue light is reflected from the white light by the BDM so as to be incident upon the corresponding input polarizer. From light which has been transmitted through the BDM, green light and red light are, respectively, reflected by the GDM and the RDM so as to be incident upon the corresponding input polarizers. Only the light oscillating in one direction for each color is transmitted through each of the input polarizers so as to be turned into s-polarized light or p-polarized light and the light oscillating in a direction orthogonal to the one direction is absorbed by each of the input polarizers. The s-polarized light or the p-polarized light irradiate to each liquid crystal panel. Each liquid crystal panel modulates the transmitted light by an image signal. The modulated light is transmitted through each output polarizer in accordance with its modulation degree and is incident upon each projection lens system so as to be projected onto a screen at an enlarged scale.

As is apparent from the foregoing, if the liquid crystal panel employs TN liquid crystals, linearly polarized light is required to be incident upon the liquid crystal panel. Therefore, the input and output polarizers should be provided forwards of and rearwards of the liquid crystal panel, respectively. Theoretically, the polarizers absorb 50% or more of light. Therefore, such a problem exists that when light is projected onto a screen at an enlarged scale, only an image of low luminance is obtained. Furthermore, the light absorbed by the polarizers is turned into heat, thus resulting in a deterioration of the reliability of the polarizers and the liquid crystal panel.

As one example of a prior art liquid crystal panel employing no polarizer, U.S. Pat. No. 4,435,047 proposes a polymer dispersion liquid crystal element in which liquid crystal droplets are formed in a polymer matrix such that a changeover between light scattering and light transmission is performed by impressing a voltage. However, in this prior art polymer dispersion liquid crystal element, since light scattering is insufficient, it is impossible to obtain an image of both high luminance and high contrast.

Meanwhile, U.S. Pat. No. 4,389,096 or U.S. Pat. No. 4,729,640 proposes an element in which nematic liquid crystals and a diffraction grating are combined with each other. However, liquid crystal is a uniaxial birefringent crystal. Thus, if material having an isotropic refractive index is used for the diffraction grating, the element operates based on changes of polarization and characteristics of the diffraction grating change according to the direction of polarization. Namely, light oscillated in a specific direction is diffracted according to a difference in refractive index between the diffraction grating and liquid crystal. However, light oscillated in a direction orthogonal to the above specific direction is not modulated at all because of no difference in refractive index between the diffraction grating and liquid crystal. Namely, a mere 50% of natural light can be modulated.

In order to solve the above-mentioned problems of TN liquid crystals, the present invention employs a polymer dispersion liquid crystal material. In a liquid crystal panel employing polymer dispersion liquid crystal, since no polarizer is used, its optical efficiency can be quite high. Furthermore, by forming the diffraction grating on a surface of a substrate, an image of high contrast is obtained.

Polymer dispersion liquid crystal is described briefly, hereinbelow. Polymer dispersion liquid crystal can be roughly divided into two types according to the state in which the liquid crystals are dispersed in the polymer. In one type, liquid crystal particles in the form of water drops are dispersed in polymer. In this type, the liquid crystal particles are present in a discontinuous state in the polymer. Hereinbelow, this type of the liquid crystal is referred to as "PDLC" and a liquid crystal panel employing PDLC is referred to as a "PD liquid crystal panel". In the other type, a network of polymer is stretched throughout a liquid crystal layer as if the liquid crystal were absorbed by a sponge. In this type, the liquid crystal is not in the form of water drops but is present continuously in the polymer. Hereinbelow, this type of the liquid crystal is referred to as "PNLC" and a liquid crystal panel employing the PNLC is referred to as a "PN liquid crystal panel". When an image is displayed by using one of the above-mentioned two kinds of liquid crystal panels, light scattering and light transmission are controlled by an electric field.

The PD liquid crystal panel operates based on the fact that there is a difference in refractive index between polymer and liquid crystal in a direction of alignment of the liquid crystal. When no voltage is applied to the liquid crystal panel, the liquid crystal particles in the form of water drops are oriented in irregular directions. In this state, a difference in refractive index between the polymer and the liquid crystal is produced and thus, incident light is scattered. If a voltage is applied to the liquid crystal panel at this time, the liquid crystal particles are aligned in one direction. If a refractive index of the liquid crystal at the time when the liquid crystal particles are aligned in one direction is preliminarily set to a refractive index of the polymer, incident light is transmitted through the liquid crystal panel without being scattered.

On the other hand, the PN liquid crystal panel is based on the irregularity of the orientation of liquid crystal molecules. In an irregular state of orientation, namely, when no voltage is applied to the liquid crystal panel, incident light is scattered. On the contrary, when the liquid crystal molecules are aligned in one direction by applying a voltage to the liquid crystal panel, light is transmitted through the liquid crystal panel. Meanwhile, it should be noted that the operation of the PD liquid crystal panel and the PN liquid crystal panel have been described only in general terms.

The present invention is not limited in its application to one of the PD liquid crystal panel and the PN liquid crystal panel. However, in order to facilitate the description of the present invention, reference will only be made to the PD liquid crystal panel. Meanwhile, the PD liquid crystal panel and the PN liquid crystal panel will be generically referred to as a "polymer dispersion liquid crystal panel".

Thermoplastic resin or thermosetting resin may be used as a polymer matrix of the polymer dispersion liquid crystal layer as long as it is basically transparent. However, ultraviolet-curing resin, which is most convenient and has excellent performance, is generally used because a conventional production method of the TN mode liquid crystal panel can be applied to the ultraviolet-curing resin without any modification. In order to produce a liquid crystal panel, the following method has usually been employed. Namely, predetermined electrode patterns are preliminarily formed on upper and lower substrates, respectively, and the upper and lower substrates are piled on each other such that electrodes on the upper and lower substrates confront each other. At this time, in a state where a spacer having a predetermined uniform particle size is interposed between the upper and lower substrates so as to secure a clearance between the upper and lower substrates, the substrates are secured by a sealing compound made of epoxy resin and thus, a hollow cell is obtained. Then, liquid crystal is injected into the hollow cell.

In order to produce a polymer dispersion type of liquid crystal panel by applying this known production method, ultraviolet curing resin, for example, acrylic resin, may be used as the polymer matrix. Acrylic resin exists as a precursor having a relatively low viscosity, e.g., a monomer or oligomer before injection and acrylic resin blended with liquid crystal has sufficient fluidity to be injected into the hollow cell at ordinary temperature. Therefore, if a method is adopted in which the polymer dispersion liquid crystal is injected into the hollow cell using a method known in the production of liquid crystal panels and then, the cell is irradiated so as to cause a curing reaction, the polymer dispersion type liquid crystal panel can be produced easily.

Meanwhile, by irradiating the panel after injection, a polymerization reaction is caused only in the resin so as to change the resin into a polymer and thus, only the liquid crystal is phase-separated from the polymer. If the amount of liquid crystal is small in comparison with that of the resin, independent liquid crystal particles in the form of water drops are formed. On the other hand, if the amount of the liquid crystal is large as compared with that of the resin, a polymer matrix is present in the liquid crystal in the form of particles or a network such that the liquid crystal forms a continuous layer. At this time, unless the diameter of the liquid crystal particles or the diameter of pores of the polymer network is generally uniform and ranges from 0.1 μm to several μm, light scattering performance is poor and thus, contrast is not raised. Therefore, the resin should be cured in a relatively short period. To this end, ultraviolet curing resin is desirable as the resin.

As described above, since the polarizers are not required to be provided in the polymer dispersion liquid crystal panel, the polymer dispersion liquid crystal panel has high optical efficiency so as to display an image of quite high luminance. However, if the above-mentioned polymer dispersion liquid crystal is used for the liquid crystal panel, the following two problems arise. One problem is that the polymer dispersion liquid crystal layer is separated from an opposed electrode or a pixel electrode. This phenomenon occurs because close contact between the polymer dispersion liquid crystal layer and the electrodes made of indium-tin-oxide (ITO) or the like is low. In a liquid crystal projection type television set, heat of 50° to 60° C. is applied to the liquid crystal panel during the "ON" state of a lamp acting as a light source. On the contrary, the liquid crystal panel is set to room temperature of 10° to 30° C. during the "OFF" stale of the lamp. Accordingly, by turning on and off the light source of the liquid crystal projection type television set, the liquid crystal panel is subjected to severe thermal shock. The above mentioned separation is caused by this thermal shock, etc.

The other problem is that light scattering characteristics are poor. In order for this polymer dispersion type liquid crystal panel to be practical, the liquid crystal panel should not only be driven at low voltage but should display an image of sufficient contrast. In order to obtain an image of remarkably excellent quality, it is preferable that contrast ratio is not less than 30:1 for direct vision type and not less than 100:1 for projection type. In order to increase the contrast ratio, light scattering characteristics should be improved. Perfect diffusion may be considered as one goal of light scattering action. As described in Proceedings of SID, p.138 (1977) by Dewey, the contrast ratio CR in perfect diffusion can be calculated from the following equation.

$CR = 1/\sin^2 \sigma$

In the above equation, σ denotes a converging angle (half angle). Up to the present, light scattering characteristics of the polymer dispersion liquid crystal panel are rather inferior to those in a perfect diffusion state which is ideal light scattering state.

When a currently available polymer dispersion liquid crystal panel is used as a projection type display, the f-number of a concave mirror converging optical system employing a metal halide lamp use and a projection optical system matched with the concave mirror converging optical system ranges from 4 to 5 and thus, the contrast ratio is as insufficient as 35:1.

SUMMARY OF THE INVENTION

Accordingly, an essential object of the present invention is to provide a liquid crystal panel and a liquid crystal projector, which display an image of high luminance and high contrast.

In order to accomplish this object of the present invention, a liquid crystal panel according to the present invention comprises: first and second substrates at least one of which has a light transmission property and which confront each other; first and second electrode layers which are formed on opposed faces of said first and second substrates, respectively; a polymer dispersion liquid crystal layer which is sandwiched between said first and second substrates; and a layer which is formed on at least one of said first and second electrode layers and has an uneven sectional shape so as to define concavities, at least liquid crystals disposed in the concavities of said layer being aligned in a predetermined direction.

A liquid crystal projector according to the present invention comprises: a liquid crystal panel as described above; a light generating means; a first optical member for guiding to said liquid crystal panel, light generated by said light generating means; and a second optical member for projecting light modulated by said liquid crystal panel; wherein either said first optical member includes an anamorphic lens or said second optical member includes a diaphragm having an irregularly shaped opening.

More specifically, the layer is made of light transmitting material having a refractive index $n_t$ equal to or approximate to a refractive index $n_p$ of polymer. Meanwhile, if liquid crystal has a refractive index $n_o$ for an ordinary ray and a refractive index $n_e$ for an extraordinary ray, then:

$n_p = n_o$

In the OFF state of the liquid crystal layer, the liquid crystal layer as a whole exhibits macroscopically a refractive index $n_x$ which is a combination of the refractive index $n_p$ of the polymer and the refractive indexes $n_o$ and $n_e$ of the liquid crystal. Since $n_x$ is different from the refractive index $n_t$ of the layer having the uneven sectional shape, a difference between the refractive index of the liquid crystal layer and that of the layer is produced. When convexities and concavities of the layer having the uneven sectional shape are formed at regular intervals, light incident upon the liquid crystal panel is diffracted and thus, less light proceeds straightforwardly. In other words, the layer having the uneven sectional shape functions as a phase diffraction grating. This means that when the polymer dispersion liquid crystal layer is in a light scattering state, light scattering performance is apparently raised. In the ON state of the liquid crystal layer, liquid crystal molecules are oriented in one direction and the following relation is obtained.

$n_p = n_o = n_x$

Thus, the following relation is obtained.

$n_p = n_t = n_x$

This means that the difference between the refractive index $n_x$ of the liquid crystal layer and the refractive index $n_t$ of the layer having the uneven sectional shape vanishes. Accordingly, since a state in which the effect of the diffraction grating has been eliminated is brought about, incident light proceeds straightforwardly.

If liquid crystal molecules in the polymer dispersion liquid crystal layer are preliminarily aligned in one direction, the apparent refractive index of the liquid crystal becomes larger than that of a state in which liquid crystal molecules are directed at random. When differences in refractive index between the liquid crystal and the polymer and between the liquid crystal and the diffraction grating are large, light scattering performance and diffraction efficiency of the liquid crystal panel are raised.

Meanwhile, since the formation of the diffraction grating leads to the formation of uneven portions on the opposed electrode or the pixel electrode, close contact between the liquid crystal layer and the opposed electrode or the pixel electrode is strengthened. If the diffraction grating is made of material having a light transmission property, the opening ratio of pixels does not drop.

When the liquid crystal panel is used in the liquid crystal projector, the following remarkable effects can be achieved. Namely, the contrast of an image can be improved greatly by the light scattering effect and the diffraction effect. Meanwhile, in the present invention, by using anamorphic lenses upstream of the liquid crystal panels, diffusion angles of blue, green and red light rays are made different from one another. Subsequently, when the light rays are incident upon the liquid crystal panels, directional nonuniformity of light scatting performance or diffraction performance is corrected by the anamorphic lenses. Alternatively, when irregularly shaped apertures are used, the maximum diameters of the openings of the apparatus vary in directional conformity with differences among the light scattering or diffraction characteristics of the liquid crystal panels so that the above correction can be performed. Preferably, by using both the anamorphic lenses and the apertures, brightness and contrast ratio of an image can be made uniform. Meanwhile, since optical efficiency is also raised, a bright image can be displayed. Furthermore, in the present invention, when at least one of the radius of curvature of the anamorphic lens and the maximum diameter of the opening of the irregular aperture in, especially, the modulation system for red light is made different from those of other modulation systems, the contrast of an image as a whole can be improved remarkably.

BRIEF DESCRIPTION OF THE DRAWINGS

These and other objects and features of the present invention will become apparent from the following description of preferred embodiments thereof made with reference to the accompanying drawings, in which:

FIGS. 4(a) and 4(b) are schematic diagrams showing the distribution of luminous intensity of light emitted from the liquid crystal panel of FIG. 3;

DETAILED DESCRIPTION OF THE PREFERRED EMBODIMENTS

Figure 1:
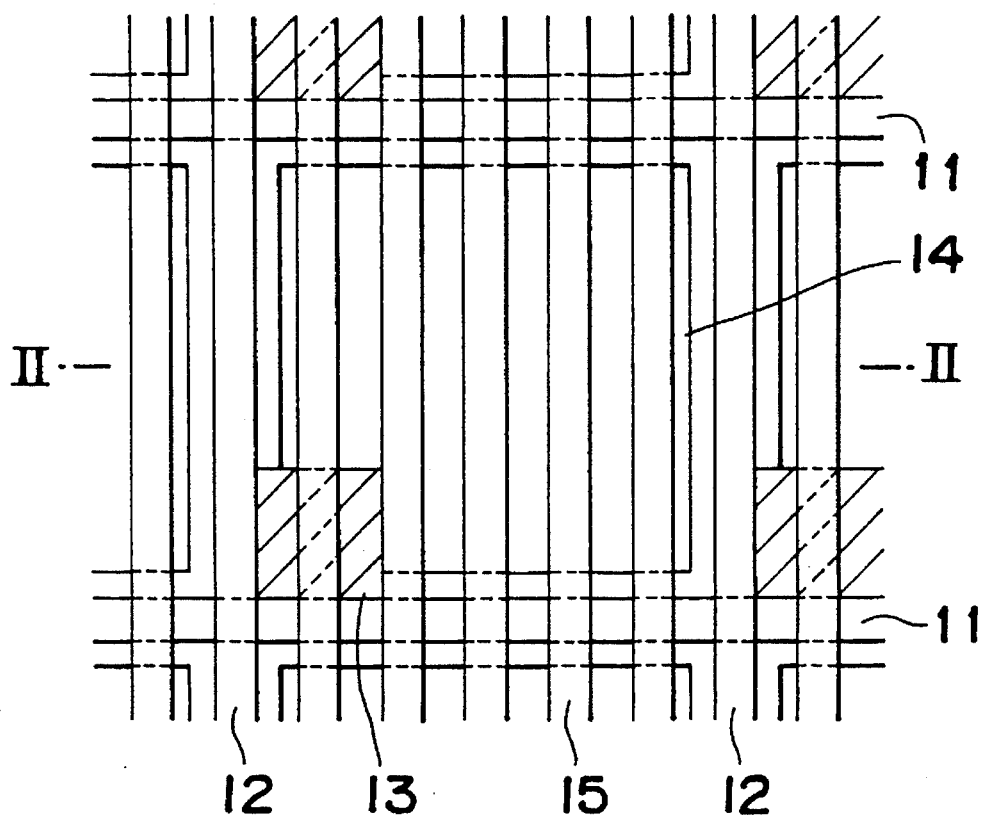
FIG. 1 is a plan view of a first embodiment portion of a liquid crystal panel according to the present invention.
Figure 2:
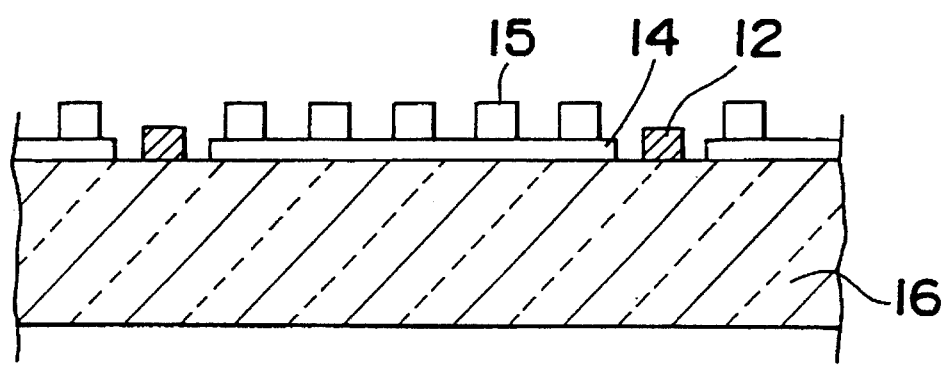
FIG. 2 is a sectional view taken along line II—II of FIG. 1.
Figure 3A:
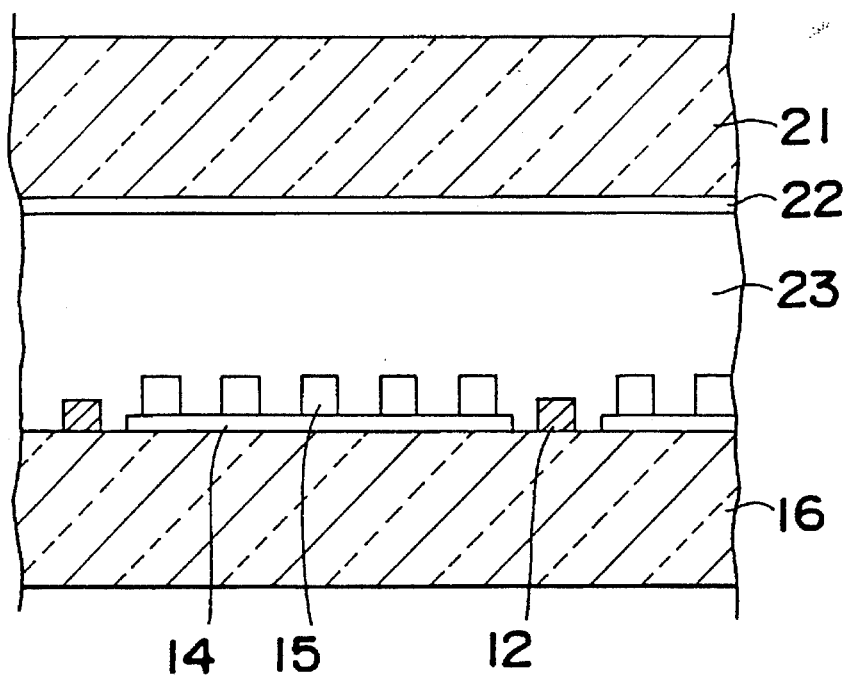
FIGS. 3(a) and 3(b) are a sectional view and a perspective view of the liquid crystal panel of FIG. 1, respectively.
Figure 3B:
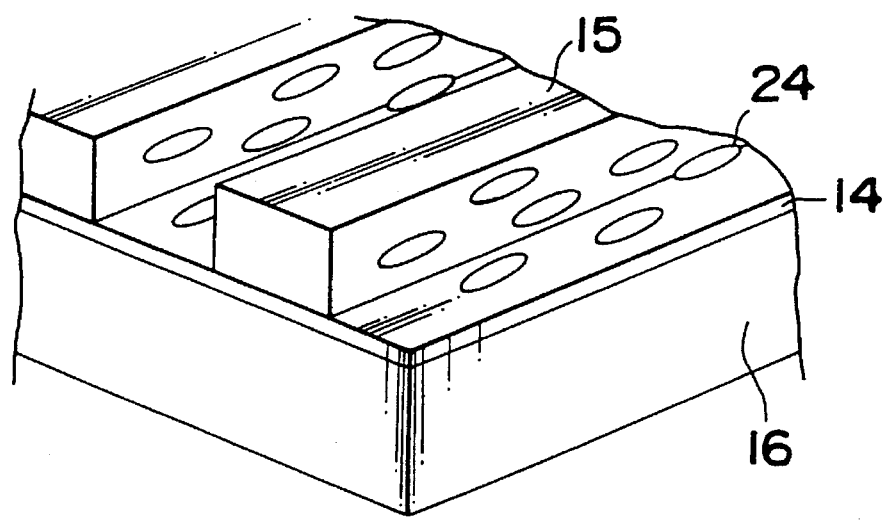

Referring now to the drawings, there is shown in FIG. 1, one pixel of a first embodiment of a transmission type of liquid crystal panel according to the present invention. For obtaining a clearer understanding of the pixel, an opposed electrode, an opposed substrate, etc. of the liquid crystal panel are not illustrated in FIG. 1. In FIGS. 1 and 2, a layer 15 having an uneven sectional shape as well as a light transmission property is formed in a striped pattern on an array substrate 16. Meanwhile, in FIG. 3(a), an opposed electrode 22 is mounted on the array substrate 16 and a polymer dispersion liquid crystal material is injected, to form a polymer dispersion liquid crystal layer 23, between the array substrate 16 and the opposed electrode 22. The layer 15 may also be formed on the opposed electrode 22. FIG. 3(b) schematically shows that liquid crystal molecules 24 in the polymer dispersion liquid crystal layer 23 have a molecular major axis aligned in parallel with the layer 15. In FIG. 3(a), a black matrix for shielding a gate signal line 11, a source signal line 12 and a thin film transistor (TFT) 13 is not illustrated but may be provided on the opposed electrode 21. In this embodiment, convex and concave portions of the layer 15 are formed at regular intervals. In other words, the layer 15 having the uneven sectional shape functions as a phase diffraction grating and is referred to as "diffraction grating" hereinbelow. It should be noted that since the drawings are illustrated schematically, the number of the diffraction gratings 15, width and shape of each of the diffraction gratings 15, etc. are not restricted to those shown in the drawings. More specifically, the pixel has a size of 30 to 200 μm and the diffraction gratings have a pitch of 1 to 15 μm. Thus, actually, the number of the diffraction gratings 15 is greater than that shown in FIGS. 1 and 2.

It is preferable that the material of the diffraction gratings 15 has a light transmission property and is optically isotropic. Such a material includes inorganic substances such as $SiO_x$, $SiN_x$, $TaO_x$, glass, etc. and organic substances such as polyimide resin, acrylic resin, etc. The material for the diffraction gratings 15 is selected in accordance with the refractive index of the polymer dispersion liquid crystal layer 23. Usually, the polymer dispersion liquid crystal layer 23 includes a liquid crystal component having a refractive index $n_o$ of 1.45 to 1.55 for ordinary rays and a refractive index $n_e$ of 1.65 to 1.80 for extraordinary rays, and a polymer component having a refractive index $n_p$ of 1.45 to 1.55. In the case of liquid crystal having positive dielectric anisotropy, if the apparent refractive index of the liquid crystal at the time of application of a voltage thereto is no, the relation of $n_p=n_o$ is required to be satisfied for the liquid crystal to be transparent in this state. Likewise, in order to obtain an efficiency of 100% for the diffraction gratings 15 at the time of application of the voltage to the liquid crystal, the diffraction gratings 15 should have a refractive index $n_t$ equal to $n_o$, namely, $n_t=n_o$. From the above, $SiO_2$ which is easy to form and process is considered a suitable organic material of the diffraction gratings 15. $SiO_2$ usually has a refractive index of 1.45 to 1.50 approximately. Meanwhile, in order to form the diffraction gratings 15, a mask is formed after the deposition of $SiO_2$ onto substrate 16 and then, the $SiO_2$ is etched. On the other hand, it is optimum that transparent polymer identical with that used for the liquid crystal layer 23 is used as organic material of the diffraction gratings 15. When the diffraction gratings 15 are formed by using the materials referred to above, the materials are coated on the substrate 16 by using a roll quarter, a spinner, etc. and only necessary portions of the coated materials are polymerized by using a mask. Alternatively, after photosensitive resin composed of polymer and dopant has been spin-coated on the substrate 16, the photosensitive resin is subjected to exposed through a mask and then, the dopant is sublimed through heating at reduced pressure such that dry development of the diffraction gratings 15 is performed.

The dielectric constant of the diffraction gratings 15 is preferably larger than that of the liquid crystal in use in a direction perpendicular to its alignment vector but smaller than that of the liquid crystal in use in a direction parallel to the alignment vector. Preferably, the dielectric constant of the diffraction gratings 15 coincides with that of the liquid crystal in use in the direction parallel to the alignment vector. Thus, an electric field of a desired magnitude and direction can be imparted also to the liquid crystal layer 23 disposed on the diffraction gratings 15.

Nematic liquid crystal, smeatic liquid crystal and cholesteric liquid crystal are preferable as materials of the liquid crystal for use in the liquid crystal panel of the present invention. In addition, a mixture including a single or two or more kinds of liquid crystal compounds and a substance other than the liquid crystal compounds may also be used as material of the liquid crystal. Meanwhile, cyano biphenyl series nematic liquid crystal in which the difference between the refractive index $n_e$ for extraordinary rays and the refractive index $n_o$ for ordinary rays is relatively large is a most preferable liquid crystal material. This is because light scattering characteristics can be raised as the difference an between the refractive index $n_e$ for extraordinary rays and the refractive index $n_o$ for ordinary rays becomes larger. Transparent polymer is preferable as material of the polymer matrix. The polymer may be any one of thermoplastic resin, thermosetting resin and photo-setting resin. However, in view of feasibility of production processes, phase separation from the liquid crystal material, etc., ultraviolet curing resin is most preferably used as the polymer. As a concrete example of the ultraviolet curing resin, ultraviolet curing acrylic resin may be recited and preferably contains acrylic monomer or acrylic oligomer cured for polymerization when subjected to irradiation of ultraviolet light. Such monomer for forming the polymer includes 2-ethyl hexyl acrylate, 2-hydroxy ethyl acrylate, neopentyl glycol diacrylate, hexane diol diacrylate, diethylene glycol diacrylate, tripropylene glycol diacrylate, polyethylene glycol diacrylate, trimethylolpropane triacrylate, pentaerythritol acrylate, etc. The oligomer or the prepolymer includes polyester acrylate, i epoxy acrylate, polyurethane acrylate, etc.

Meanwhile, in order to perform polymerization rapidly, polymerization initiator may be employed. The polymerization initiator includes, for example, 2-hydroxy-2-methyl-1-phenylpropane-1-one ("Darocure 1173" of Merck & Co., Inc. of the U.S.), 1-(4-isopropyl phenyl)-2-hydroxy-2-methylpropane-1-one ("Darocure 1116" of Merck & Co., Inc.), 1-hydroxy cyclohexyl phenylketone ("Irgacure 184" of Ciba-Geigy Ltd. of Switzerland), benzyl methyl ketal ("Irgacure 651" of Ciba-Geigy Ltd.), etc.

Furthermore, chain transfer agent, photosensitizer, dye, crosslinking agent, etc. may be optionally used as necessary.

After liquid or a viscous substance in which the liquid crystal material is uniformly dissolved in this ultraviolet curing compound has been injected between the two substrates, irradiation of ultraviolet light is performed so as to cure only the ultraviolet curing compound. At this time, only the liquid crystal material is subjected to phase separation and thus, the polymer dispersion liquid crystal layer is formed.

The percentage of the liquid crystal material in the polymer dispersion liquid crystal layer is not defined here. However, the polymer dispersion liquid crystal layer preferably comprises 20 to 90% by weight of the liquid crystal material in general and more preferably, comprises 50 to 70% by weight of the liquid crystal material. When the polymer dispersion liquid crystal layer comprises not more than 20% by weight of the liquid crystal layer, the amount of the liquid crystal particles is small and thus, the light scattering effect is scant. On the other hand, when the polymer dispersion liquid crystal layer comprises not less than 90% by weight of the liquid crystal material, the interface between the liquid crystal and the polymer is reduced and light scattering is lessened. The structure of the polymer dispersion liquid crystal layer depends upon the percentage of the liquid crystal. When the polymer dispersion liquid crystal layer comprises not more than about 50% by weight of the liquid crystal, the liquid crystal is present as independent droplets. On the other hand, when the polymer dispersion liquid crystal layer comprises not less than 50% by weight of the liquid crystal, the polymer and the liquid crystal are combined with each other into a continuous phase.

In order to control the alignment of liquid crystal molecules of the polymer dispersion liquid crystal, a method, for example, may be adopted in which when prior to irradiation of ultraviolet light, a magnetic field is applied in a direction parallel to the faces of the substrates of the panel and ultraviolet light is irradiated while the liquid crystal molecules injected between the substrates are being aligned in the direction of the magnetic field, where by the liquid crystal molecules are secured in position as they are. Thus, as schematically shown in FIG. 3(b), the liquid crystal molecules 24 are aligned such that the molecular major axes of the liquid crystal molecules 24 extend parallel to the diffraction gratings 15.

A case is considered here in which liquid crystal having positive dielectric anisotropy is employed. The apparent refractive index $n_x$ of the liquid crystal molecules 24 in having positive dielectric anisotropy is employed. Apparent the OFF state is expressed as follows.

$$n_x = (n_o + n_e)/2 \quad (1)$$

On the contrary, the apparent refractive index of the liquid crystal molecules 24 in the ON state is equal to $n_o$. Assuming that refractive index of the polymer is $n_o$, the difference $\Delta n$ in refractive index between the liquid crystal molecules 24 and the polymer is given by the following equation.

$$\Delta n = (R_e)/2 \quad (2)$$

Assuming that the liquid crystal molecules 24 are not aligned so as to be directed at random, the apparent refractive index $n_x$ of the liquid crystal molecules 24 in the OFF state is expressed as follows.

$$n_x = (2n_o + n_e)/3 \quad (3)$$

Likewise, at this time, the difference $\Delta n$ in refractive index between the liquid crystal molecules 24 and the polymer is given by the following equation.

$$\Delta n = (n_e - n_o)/3 \quad (4)$$

By comparing the equations (2) and (4) with each other, the difference $\Delta n$ in refractive index between the liquid crystal molecules 24 and the polymer at the time when the liquid crystal molecules 24 are aligned can be made larger than that at the time when the liquid crystal molecules 24 are not aligned. Namely, light scattering characteristics at the time when the liquid crystal molecules are aligned can be made larger than those at the time when the liquid crystal molecules 24 are not aligned.

In order to cause the diffraction gratings 15 to appear and disappear when the liquid crystal is in the OFF state and the ON state, respectively, the refractive index $n_r$ of the diffraction gratings 15 should be so set as to be equal to or in the vicinity of $n_o$. A light ray emitted from the panel at the time when the liquid crystal is in the OFF state is described with reference to FIG. 4(a), hereinbelow. For a light ray oscillating in a direction parallel to the diffraction gratings 15 as shown in FIG. 4(a), the apparent refractive index $n_x$ of the liquid crystal molecules 24 is equal to $n_e$, i.e. $n_x = n_e$, so that difference $\Delta n$ ($= n_e - n_o$) in refractive index between the diffraction gratings 15 and the liquid crystal molecules 24 is produced. Therefore, the light ray in this direction undergoes not only modulation based on scattering of the light ray but modulation based on diffraction of the light ray.

On the other hand, for a light ray oscillating in a direction perpendicular to the diffraction gratings 15 as shown in FIG. 4(b), the apparent refractive index $n_x$ of the liquid crystal molecules 24 is equal to $n_o$, i.e., $n_x = n_o$ and thus, $n_r = n_x$. Therefore, no difference in refractive index between the diffraction gratings 15 and the liquid crystal molecules 24 is produced. Accordingly, the light ray in this direction undergoes modulation based on scattering but does not undergo modulation based on diffraction. On the contrary, when the liquid crystal is in the ON state, refractive the index of the liquid crystal is $n_o$ and thus, $n_o = n_r$. Therefore, no difference in refractive index between the diffraction gratings 15 and the liquid crystal molecules 24 is produced and thus, an incident light ray is not diffracted.

The pitch p and height d of the diffraction gratings 15 vary considerably according to the wavelength $\lambda$ of light to be modulated, refractive index of the liquid crystal layer 23, directivity of light of the optical system, and necessary diffraction efficiency, etc. In a state where no voltage is applied, an output light ray undergoes effects of scattering and diffraction. For example, in the case in which the diffraction gratings 15 have a rectangular sectional shape as shown in FIG. 1, the diffraction angle $\theta$ and efficiency $\eta_o$ of diffracted light of 0 degree are given as follows.

$$\sin\theta = m\lambda/p \quad (5)$$

$$\eta_o = 0.5 \times (1+\cos\delta) \quad (\delta = 2\pi\Delta nd/\lambda) \quad (6)$$

In the equation (5), m denotes the degree of diffraction. Therefore, the pitch p and the height d of the diffraction gratings 15 should be determined based on the directivity of light of the optical system, the diffraction angle θ and the wavelength λ but are usually affected by process conditions for forming the diffraction gratings 15. The pitch p ranges from 2 μm to 60 μm, approximately, and ranges from 4 μm to 20 μm most preferably. The profile of the diffraction gratings 15 usually assume the shape of a sine curve, triangular wave or sawteeth due to the process conditions but may be designed to assume any other shape which secures similar effects.

The height d of the diffraction gratings 15 largely depends on diffraction efficiency. In the case in which the liquid crystal molecules are directed at random, the difference Δn between the refractive index $n_f$ of the diffraction gratings 15 and the refractive index $n_x$ of the liquid crystal layer i.e., ($n_f - n_x$), is a mere 0.1. Thus, when the diffraction gratings 15 have a rectangular sectional shape, the height d for setting light of 0 degree of diffraction to zero should be as large as 3 to 5 μm. On the other hand, in the case in which the liquid crystal molecules are aligned, the difference Δn can be set to 0.2 or more, so that 1 to 2 μm may be sufficient for the height d for setting light of 0 degree of diffraction and thus, it becomes easy to form the diffraction gratings.

Meanwhile, the liquid crystal layer preferably has a thickness of 5 to 25 μm and more preferably 8 to 15 μm for the following reason. Namely, when the thickness of the liquid crystal layer exceeds 20 μm, light incident upon the liquid crystal panel is set to state of perfect diffusion. As a result, light scattering characteristics are excellent but a high voltage is required for driving the liquid crystal panel. On the contrary, when the thickness of the liquid crystal layer is less than 8 μm, the liquid crystal panel can be driven by a low voltage but light scattering characteristics deteriorate.

Figure 5A:
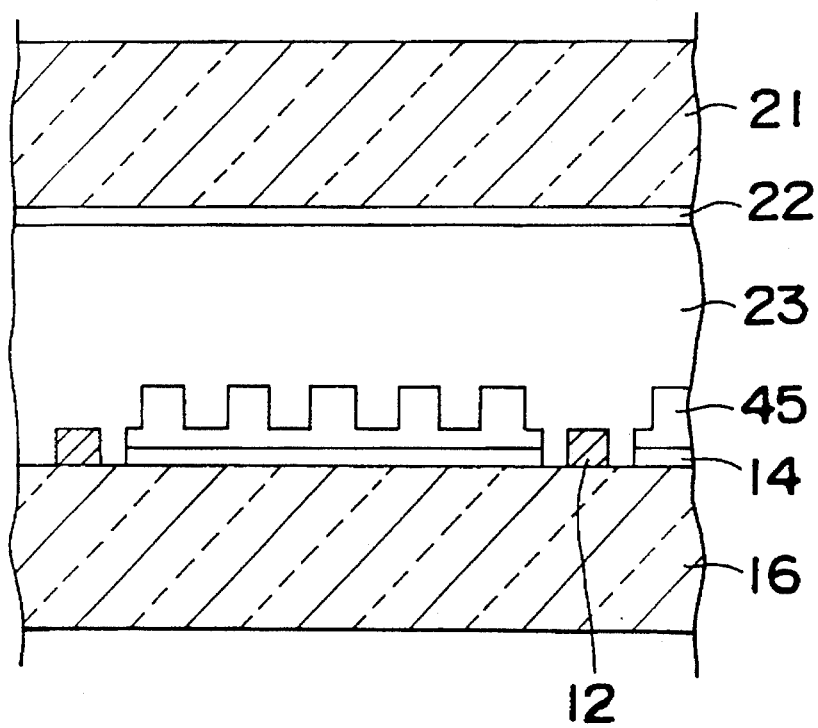
FIGS. 5(a) and 5(b) are a sectional view and a perspective view of a second embodiment of a liquid crystal panel according to the present invention, respectively.
Figure 5B:
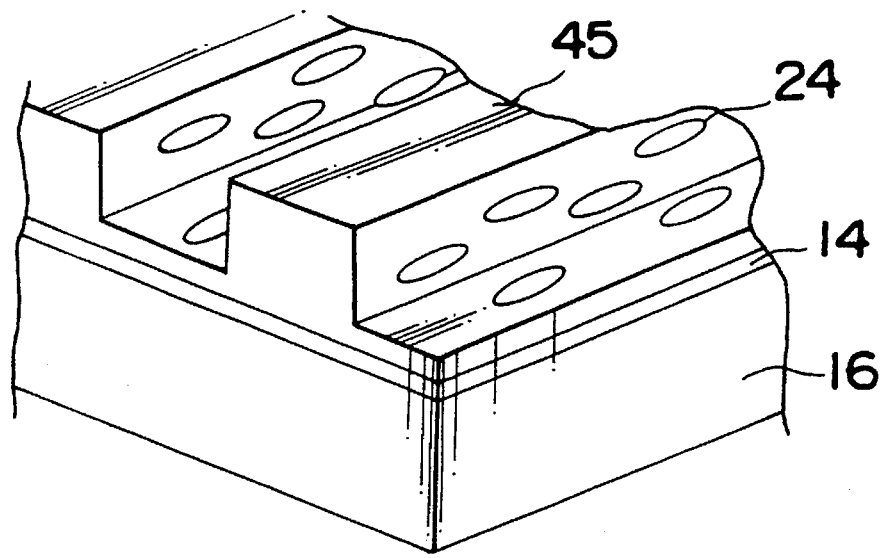

In FIGS. 1 to 3(b), the diffraction gratings 15 consist of spaced apart convexities such that a pixel electrode 14 formed on an inner face of the array substrate 16 is exposed between the convexities, while an opposed electrode 22 formed on an inner face of the opposed substrate 21 confronts the pixel electrode 14. FIGS. 5(a) and 5(b) show a second embodiment of a transmission type of liquid crystal panel according to the present invention. In this embodiment, the liquid crystal panel includes diffraction gratings 45 each formed on the pixel electrode 14. The diffraction grating 45 is formed by a toothed thin film having alternately disposed convex and concave portions such that the thin film covers the pixel electrode 14. The thickness of the concave portions of the diffraction grating 45 preferably ranges from 200 Å to 1 μm, approximately. If the thickness of the concave portions of the diffraction grating 45 becomes too large, a voltage drop occurs at the concave portions, so that it becomes difficult to apply a voltage to the liquid crystal. Nonetheless, the desired effects can be obtained. Unlike the diffraction grating 15 of the first embodiment, the liquid crystal molecules 24 of this embodiment may be aligned by a rubbing process hitherto utilized for TN mode liquid crystal, in which a cloth or the like is directly rubbed against the diffraction grating 45. Usually, the pixel electrode 14 and the opposed electrode 22 are made of indium-tin-oxide (ITO) having excellent transparence.

Figure 6:
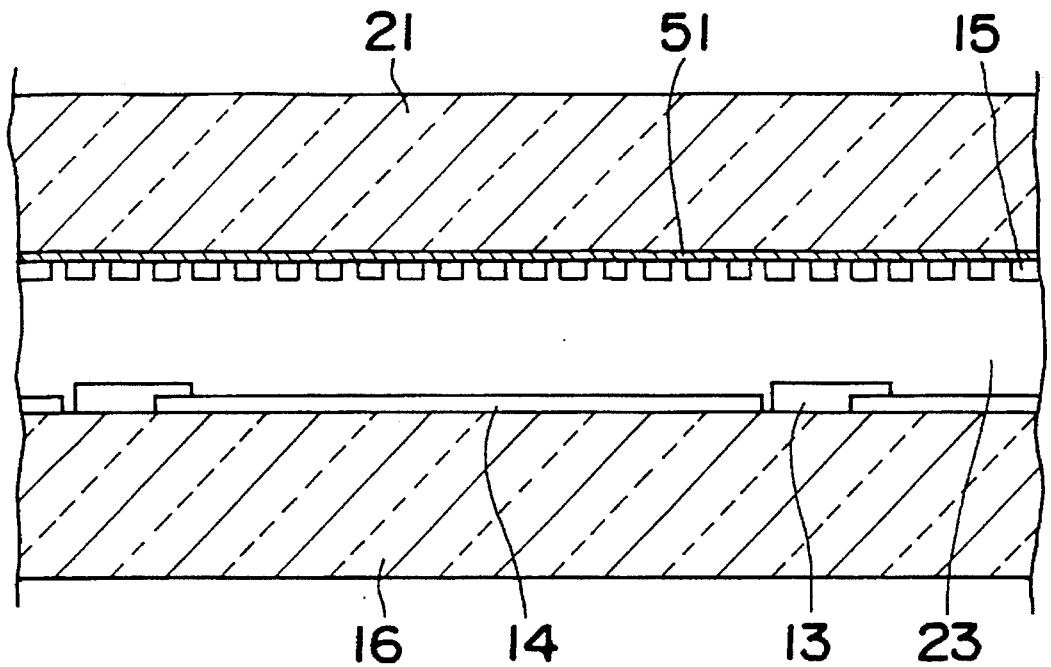
FIG. 6 is a sectional view of a third embodiment of a liquid crystal panel according to the present invention.

FIG. 6 shows a third embodiment of a reflection type of liquid crystal panel according to the present invention. In FIG. 6, the opposed electrode 22 of the first and second embodiments is replaced by a reflection electrode 51 which is made of metal such as Al, Cr, etc. having high reflectance. The diffraction gratings 15 may be formed on the pixel electrode 14 but are preferably formed on the reflection electrode 51 as shown in FIG. 6. In the reflection type of liquid crystal panel, after a light ray incident upon the liquid crystal panel has been passed through the liquid crystal layer 23, the light ray is reflected by the reflection electrode 51 and then, is passed through the liquid crystal layer 23 again so as to be outputted. As a result, the optical path length of the light ray is twice the thickness of the liquid crystal layer 23. Therefore, as compared with a transmission type of liquid crystal panel provided with a liquid crystal layer having an identical thickness, light scattering characteristics are improved. In other words, in order to obtain light scattering characteristics identical with those of the transmission type of liquid crystal panel, the thickness of the liquid crystal layer 23 of the reflection type of liquid crystal panel may be approximately half of that of the transmission type liquid crystal panel. Similarly, when the height d of the diffraction gratings 15 of the reflection type of liquid crystal panel is half of that of the transmission type of liquid crystal panel, a diffraction efficiency identical with that of the transmission type of liquid crystal panel can be obtained in the reflection type of liquid crystal panel. In FIG. 6, the opposed electrode 22 is replaced by the reflection electrode 51 but the same effects can be achieved when the pixel electrode 14 is replaced by the reflection electrode 51.

Figure 7:
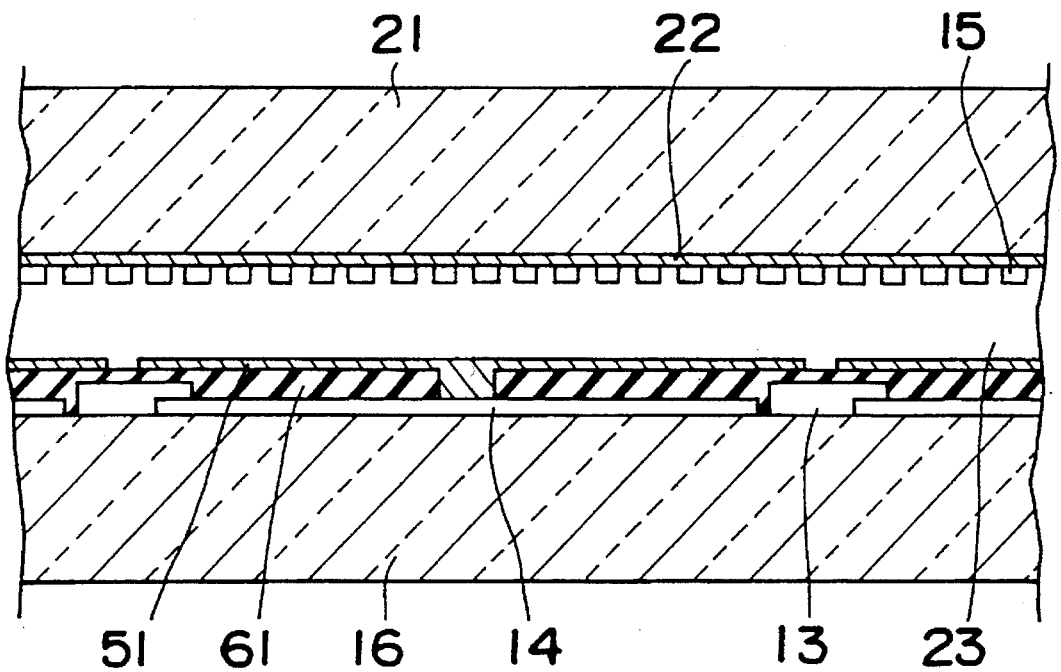
FIG. 7 is a view similar to FIG. 6, showing a modified form of the third embodiment.

FIG. 7 shows a modification of the liquid crystal panel of FIG. 6. In FIG. 7, since the reflection electrode 51 is formed on the pixel electrode 14 through an insulating layer 61, the opening ratio is improved.

Figure 8:
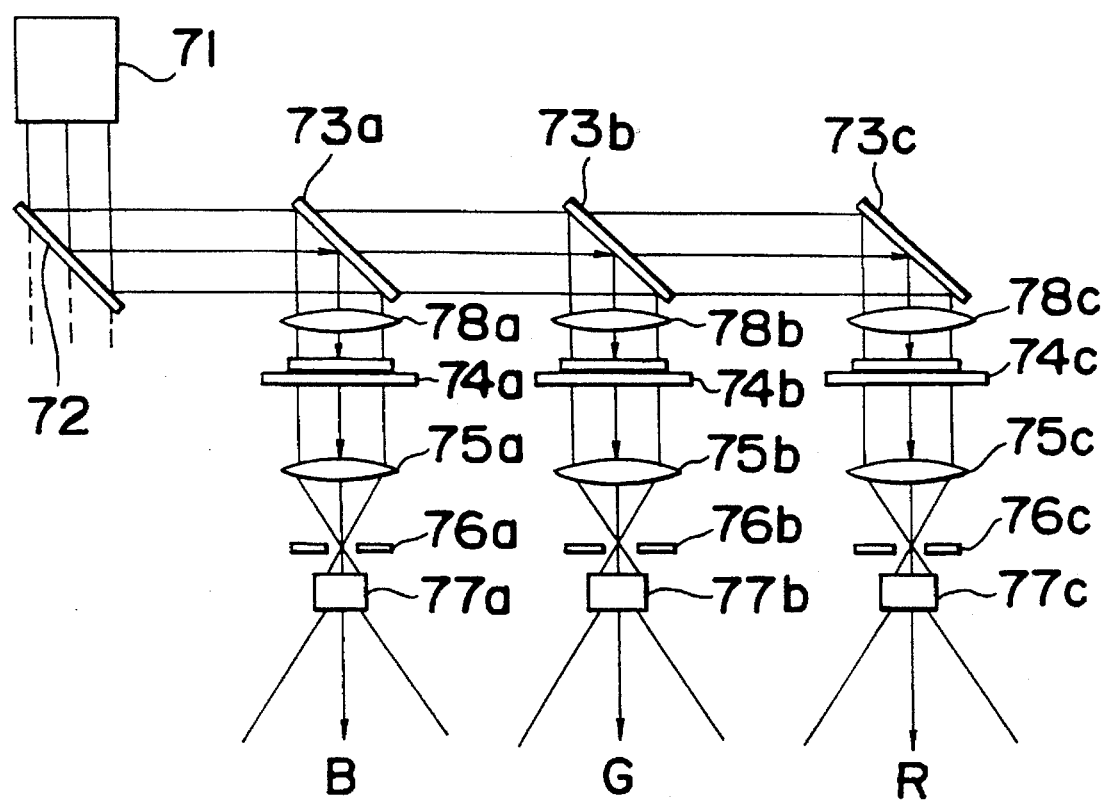
FIG. 8 is a schematic view of a first embodiment of a liquid crystal projector according to the present invention, and which employs a transmission type of liquid crystal panel of the present invention.

Hereinbelow, a first embodiment of a liquid crystal projector according to the present invention is described with reference to FIGS. 8 to 10. In FIG. 8, constituent elements unnecessary for understanding the liquid crystal projector are not illustrated. In FIG. 8, a converging optical system 71 comprises a concave mirror and a metal halide lamp of 250 W acting as a light source. The concave mirror is adapted to reflect only visible light. Furthermore, an ultraviolet filter for filtering ultraviolet light is provided at an output end of the converging optical system 71. An infrared filter 72 transmits infrared light therethrough but reflects only visible light. However, the infrared filter 72, needless to say, may be disposed in the converging optical system 71. Furthermore, a blue dichroic mirror (BDM) 73a for reflecting blue light, a green dichroic mirror (GDM) 73b for reflecting green light and a red dichroic mirror (RDM) 73c for reflecting red light are provided in this sequence along the optical path of the projector, although the present invention is not limited to this sequence and the last RDM 73c may be replaced by a total reflection mirror.

The liquid crystal projector further includes transmission type of liquid crystal panels 74a, 74b and 74c of the present invention. Among the liquid crystal panels 74a to 74c, the height d of the diffraction gratings of the liquid crystal panel 74c for modulating red light is 0.1 to 0.2 μm higher than those of the liquid crystal panels 74a and 74b for modulating blue light and green light, respectively. This is because the degree of diffraction depends on the wavelength of the light to be modulated. Meanwhile, as necessary, the height d of the diffraction gratings of the liquid crystal panel 74a for modulating blue light is also 0.1 to 0.2 μm lower than that of the liquid crystal panel 74b for modulating green light. In addition, in the liquid crystal panel 74c, the diameter of the liquid crystal particles in the form of water drops are larger than those of the liquid crystal panels 74a and 74b or the thickness of the liquid crystal layer is greater than those of the liquid crystal panels 74a and 74b. This is because light scattering characteristics deteriorate as the wavelength of light becomes longer. The diameter of the liquid crystal particles in the form of water drops can be set by regulating the amount of ultraviolet light used for polymerization or by selecting an appropriate material. The thickness of the liquid crystal layer can be set by establishing an appropriate diameter of the liquid crystal particles.

Furthermore, the liquid crystal projector includes lenses 75a to 75c and 77a to 77c and apertures 76a to 76c acting as diaphragms. A projection lens system is constituted by a lens 75, aperture 76 and lens 77. A lens 78 disposed immediately in front of the liquid crystal panel 74 is an anamorphic lens having radii of curvature different in two orthogonal directions.

Next, the operation of the liquid crystal projector will be described. Since the modulation systems for red light R, green light G and blue light B operate substantially in the same manner, only the operation of the modulation system for blue light B will be described by way of example. Initially, white light is irradiated from the converging optical system 71 and the blue light component of the white light is reflected by the BDM 73a. This blue light is incident upon the polymer dispersion liquid crystal panel 74a. In a polymer dispersion liquid crystal panel of the present invention, the degree of scattering (diffraction) changes according to the direction of a wave front of output light. As schematically shown in FIGS. 4(a) and 4(b), the distribution of luminous intensity of light emitted from the liquid crystal panel in the OFF state of the liquid crystal panel changes according to directions of oscillations of light. In FIG. 4(b) showing the distribution of luminous intensity of light having a wave front oscillating in the direction perpendicular to the diffraction gratings 15, incident light is not only scattered but diffracted so as to be outputted. However, as shown in FIG. 4(a), the distribution of luminous intensity of light having a wave front oscillating in the direction parallel to the diffraction gratings 15 is not diffracted at all but undergoes only scattering. As described above, light scattering effects vary according to the directions of oscillations of light.

Because the diffraction gratings 15 are striped, a diffraction occurs in which light is bent only in a direction orthogonal to the stripes and is not bent in a direction parallel to the strips. Thus, light scattering effects vary according to the longitudinal direction of the strips. Therefore, before blue, green and red light rays are, respectively, incident upon the liquid crystal panels 74a, 74b and 74c, the anamorphic lenses 78a, 78b and 78c are provided so as to preliminarily make diffusion angles of the light rays different from one another. Subsequently, when the light rays are, respectively, incident upon the liquid crystal panels 74a, 74b and 74c, the anamorphic lenses 78a, 78b and 78c correct directional nonuniformity of light scattering performance. Scattered light is intercepted by the aperture 76a. On the contrary, collimated rays or light propagating at a predetermined angle passes through the aperture 76a. The modulated light is projected onto a screen (not shown) at an enlarged scale by the projection lens 77a. In this way, the blue light component of the image is uniformly displayed on the screen. Likewise, the polymer dispersion liquid crystal panels 74b and 74c modulate green and red light components of the white light, respectively. As a result, a color image is displayed on the screen.

The projection lens system is arranged as follows. Initially, the lens 75 and the aperture 76 are arranged such that a distance between the polymer dispersion liquid crystal panel 74 of the liquid crystal display and the lens 75 is substantially equal to a distance between the lens 75 and the aperture 76. This projection lens system functions to transmit therethrough collimated rays transmitted through the liquid crystal panel 74 and to intercept light scattered at the liquid crystal panel 74. As a result, an image of high contrast can be displayed on the screen. If the diameter of an opening of the aperture 76 is reduced, contrast is improved but luminance of the image on the screen drops. When the shapes of the openings of the apertures 76a, 76b and 76c conform to light scattering performances of the liquid crystal panels 74a to 74c, respectively, it is possible to correct a directional nonuniformity of the light scattering performance of each of the liquid crystal panels 74a to 74c. In other words, when the opening of the aperture 76 is elongate in a direction in which the panel 74 diffracts light, i.e. is longer in the direction of diffraction of the panel 74 than in other directions, a bright image of high contrast can be obtained.

Figure 9:
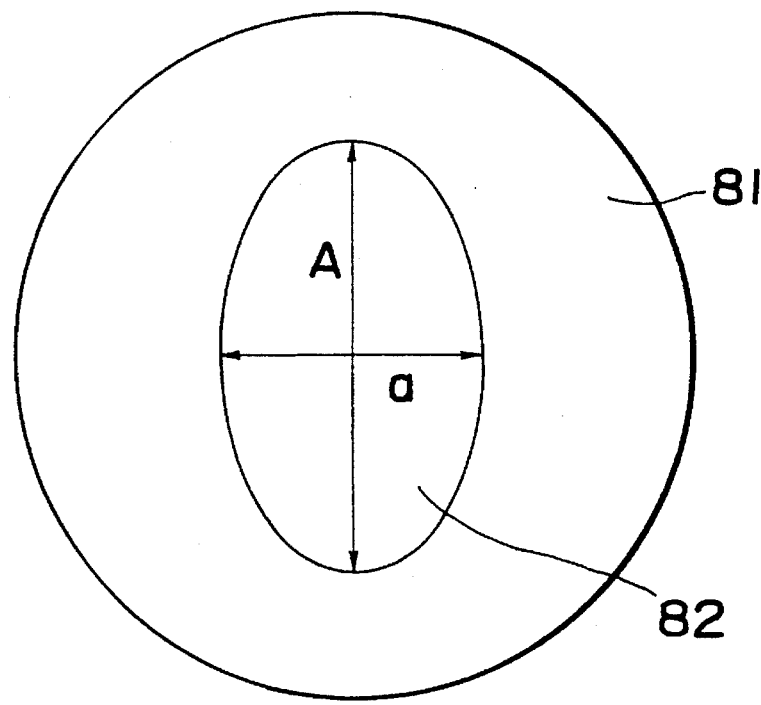
FIG. 9 is a plan view of an irregular diaphragm employed in the liquid crystal projector of FIG. 8.

More specifically, an irregular diaphragm 81 having an elliptical opening 82 shown in FIG. 9 may be employed as the aperture 76. In FIG. 9, the opening 82 has diameters A and a and measured along its orthogonal major and minor axes, respectively, with the diameter A thus being larger than the diameter a. The major axis of the opening 82 coincides with the direction of diffraction. In the liquid crystal projector shown in FIG. 8, even if the irregular diaphragm 81 is employed without using the anamorphic lens 78, predetermined effects can be achieved by the irregular diaphragm 81. However, if the irregular diaphragm 81 is employed in combination with the anamorphic lens 78 such that a diffusion angle of the light ray is directionally changed at the side of the light source in accordance with the opening 82 of the irregular diaphragm 81, greater effects can be gained.

Meanwhile, in the liquid crystal projector, the radius of curvature of the anamorphic lens 78c for modulating red light is larger than those of the anamorphic lenses 78a and 78b for modulating blue light and green light, respectively. Furthermore, the maximum diameter of the opening 82 of the irregular diaphragm 81c used in the modulation system for red light is smaller than those of the irregular diaphragms 81a and 81b used in the modulation systems for blue light and green light, respectively for the following reason. Namely, light scattering characteristics and diffraction effects depend on wavelength. Thus, light scattering characteristics and diffraction effects of the liquid crystal panel 74c for modulating red light are lower than those of the liquid crystal panels 74a and 74b for modulating blue light and green light, respectively.

Figure 10:
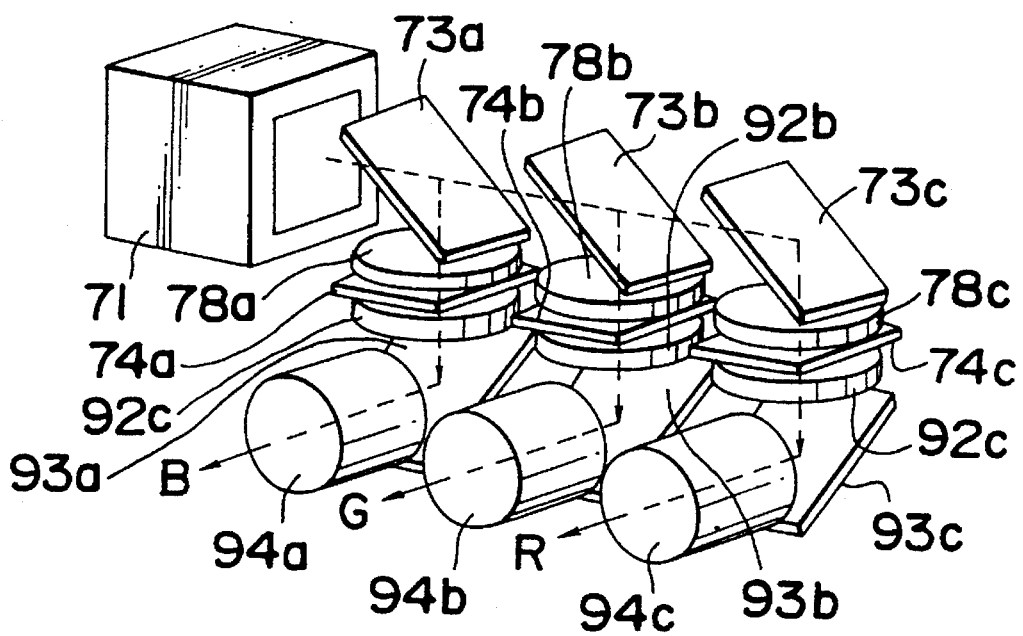
FIG. 10 is a perspective view of the liquid crystal projector of FIG. 8.

One concrete example of the liquid crystal projector of FIG. 8 is shown in FIG. 10. In FIG. 10, the liquid crystal projector includes the converging optical system 71, the dichroic mirrors 73a, 73b and 73c, the liquid crystal panels 74a, 74b and 74c of the present invention, the anamorphotic lenses 78a, 78b and 78c, lenses 92a, 92b and 92c, mirrors 93a, 93b and 93c and projection lens systems 94a, 94b and 94c each provided with a projection lens and an aperture. A halogen lamp, a metal halide lamp, a xenon lamp or the like may used as a light source. The light source preferably emits rays which have a short arc length and are collimated as much as possible.

Figure 11:
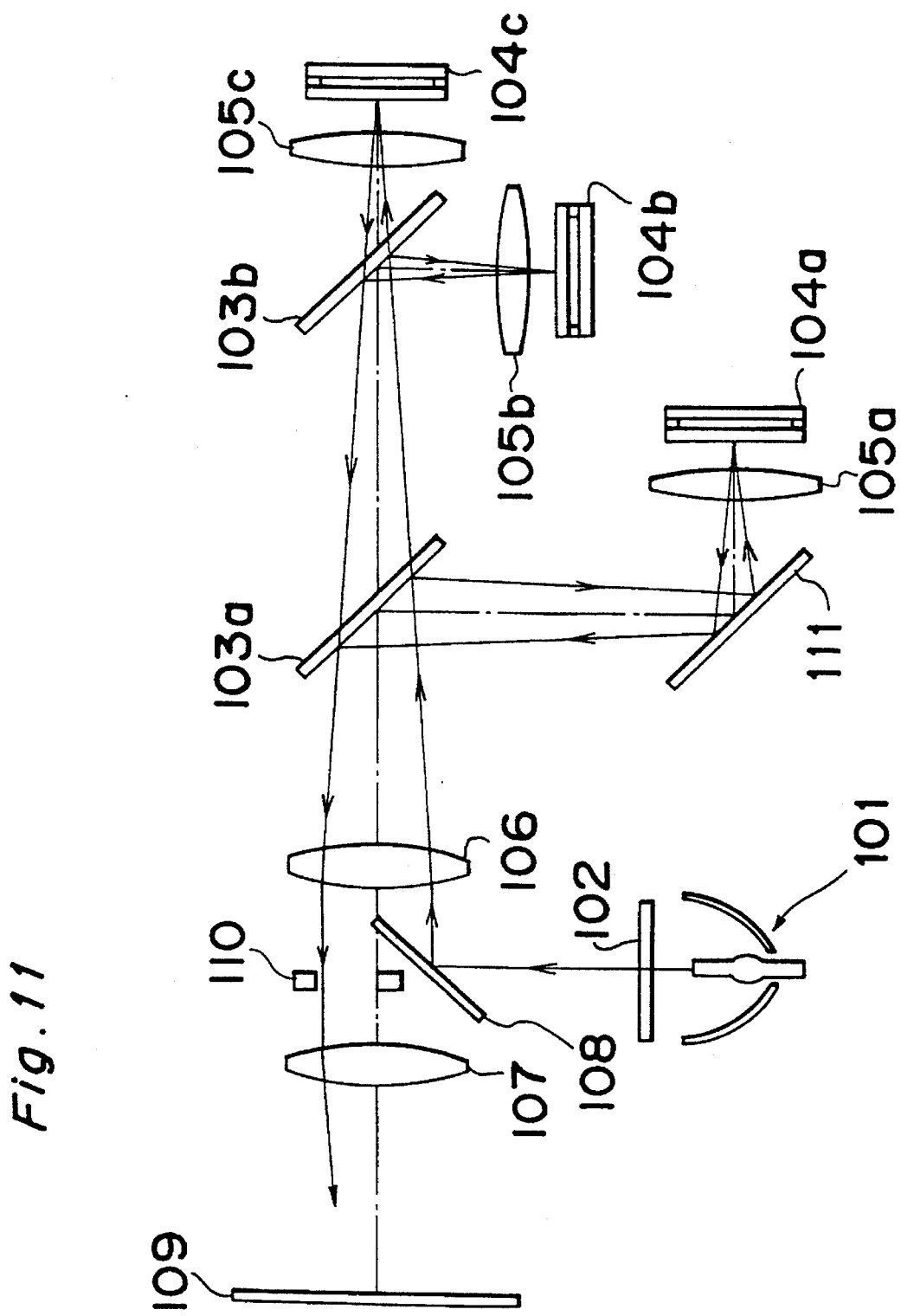
FIG. 11 is a schematic view of a second embodiment of a liquid crystal projector according to the present invention, and which employs a reflection type of liquid crystal panel of the present invention.

Finally, FIG. 11 shows a second embodiment of a liquid crystal projector according to the present invention. The liquid crystal projector includes the reflection type of liquid crystal panels of the present invention shown in FIG. 6 or 7. In FIG. 11, the liquid crystal projector includes a converging optical system 101 having a concave mirror and a light source such as a metal halide lamp or a xenon lamp. In a liquid crystal projection type of television set as one example of the liquid crystal projector of the present invention, a metal halide lamp of 250 W is employed as the light source. The light source emits rays having an arc length of about 5 mm, while the concave mirror is adapted to reflect only visible light. The liquid crystal projector further includes a UVIR filter 102 which reflects ultraviolet light and infrared light but transmits therethrough visible light, a GDM 103a and a BDM 103b. The arrangement of the GDM 103a and the BDM 103b is not limited to that shown in FIG. 11 and an RDM may also be provided additionally.

Furthermore, the liquid crystal projector includes a total reflection mirror 111, reflection type of liquid crystal panels 104a, 104b and 104c of the present invention, anamorphic lenses 105a, 105b and 105c, lenses 106 and 107, a mirror 108 and an irregular diaphragm 110. A projection optical system is constituted by the lenses 106 and 107.

The operation of the liquid crystal projector is described hereinbelow. Since the modulation systems for blue light, green light and red light operate substantially in the same manner, only the operation of the modulation system for blue light is described by way of Example. Initially, white light is irradiated from the converging optical system 101 and a blue light component of the white light is reflected by the BDM 103b. The blue light is transmitted through the anamorphotic lens 105b and incident upon the liquid crystal panel 104b. As described earlier, the liquid crystal panel 104b controls diffraction and scattering of the incident blue light by a signal supplied to its pixel electrode so as to modulate the blue light. Light reflected without being diffracted and scattered is transmitted through the irregular diaphragm 110. On the contrary, light bent by diffraction and scattering is intercepted by the irregular diaphragm 110. The transmitted light is projected onto a screen 109 at an enlarged scale by the projection lens 107.

The modulation systems for red light and green light also operate in the same manner as described above. The GDM 103a and the BDM 103b for performing color separation of the white light compose, into a display image, the green light, the blue light and the red light modulated by the liquid crystal panels 104a to 104c such that the display image is projected onto the screen 109 by the projection lens 107.

Meanwhile, the liquid crystal panel of the present invention is not limited to a TFT but may also be formed by a liquid crystal display in which a two-terminal device such as a diode is used as a switching device.

In FIGS. 8 and 10, light is incident from the side of the opposed substrate but the present invention is not limited to this arrangement. It is apparent that the same effects can be achieved even if light is incident from the side of the array substrate. As described above, the liquid crystal panel and the liquid crystal projector of the present invention are not affected by the incident direction of light.

Furthermore, the liquid crystal projector of the present invention is illustrated as a rear type of liquid crystal projector but the present invention is not so limited. For example, the present invention may be applied to a front type of liquid crystal projector in which an image is projected onto a reflection type of screen. In addition, in the liquid crystal projector of the present invention, color separation is performed by the dichroic mirror but the present invention is not so limited. For example, color separation may be performed by using an absorption type of color filter.

Moreover, in the liquid crystal projector of the present invention, a respective projection lens system is provided for each of the modulation systems for red light, green light and blue light but the present invention is not limited to this arrangement. It goes without saying that, for example, the light rays modulated by the liquid crystal panels can be formed into a single image, by using mirrors or the like, incident upon one projection lens system so as to be projected onto a screen. Furthermore, three liquid crystal panels are provided for modulating red light, green light and blue light, respectively but the present invention is not limited to this arrangement. For example, instead of three liquid crystal panels, one liquid crystal panel fitted with a mosaic color filter can be used such that images at pixels of the liquid crystal panel are projected.

What is claimed is:

1. A liquid crystal projector comprising:

a light source;

at least one liquid crystal panel disposed downstream of the light source with respect to the optical path of the projector, each said liquid crystal panel including first and second confronting substrates at least one of which is light transmissible, first and second electrode layers disposed on confronting surfaces of the first and second substrates, respectively, a polymer dispersion liquid crystal layer comprising liquid crystal dispersed in a polymer and sandwiched between said first and said second substrates, and diffraction gratings each in the form of stripes extending along at least one of said first and said second electrode layers;

at least one projection lens disposed downstream of the at least one liquid crystal panel with respect to the optical path; and at least one diaphragm disposed downstream of the at least one liquid crystal panel with respect to the optical path, each said diaphragm having an opening that is elongate as viewed in a plane parallel to the longitudinal direction of the stripes of the diffraction gratings of the liquid crystal panel disposed upstream of the diaphragm, the direction of elongation of the opening as viewed in said plane extending orthogonally to the longitudinal direction of said stripes of the diffraction gratings.

2. A liquid crystal projector as claimed in claim 1, and further comprising first, second and third color filter means for separating light from said light source into blue, green and red light rays having wavelengths within predetermined ranges, respectively, and wherein said at least one liquid crystal panel comprises first, second and third liquid crystal panels for modulating the blue, green and red light rays, respectively, the at least one projection lens includes first, second and third projection lenses for projecting the blue, green and red light rays modulated by the first, second and third liquid crystal panels, respectively, and said at least one diaphram includes first, second and third diaphragms associated with the blue, green and red light rays, respectively, the maximum diameter of the opening of one of the first, second and third irregular diaphragms being different from the maximum diameter of the opening of the others of the first, second and third diaphragms, as viewed in the respective planes parallel to the longitudinal direction of the stripes of the diffraction gratings disposed upstream of the diaphragms, respectively.

3. A liquid crystal projector as claimed in claim 1, wherein one of the first and second electrode layers is a reflective layer, said at least one liquid crystal panel includes first, second and third liquid crystal panels, and the liquid crystal projector further comprises a color separation and light coupling means for separating light from said light source into blue, green and red light rays having wavelengths within predetermined ranges, respectively, and for optically coupling the blue, green and red light rays modulated by the first, second and third liquid crystal panels.

4. A liquid crystal projector comprising:

a light source;

at least one liquid crystal panel disposed downstream of the light source with respect to the optical path of the projector, each said liquid crystal panel including first and second confronting substrates at least one of which is light transmissible, first and second electrode layers disposed on confronting surfaces of the first and second substrates, respectively, a polymer dispersion liquid crystal layer comprising liquid crystal dispersed in a polymer and sandwiched between said first and said second substrates, and diffraction gratings each in the form of stripes extending along at least one of said first and said second electrode layers;

at least one projection lens disposed downstream of the at least one liquid crystal panel with respect to the optical path; and at least one anamorphic lens disposed along the optical path between the light source and the at least one liquid crystal panel, said anamorphic lens having a curvature that diffuses light, transmitted along the optical path, in a direction extending orthogonally to the longitudinal direction of the stripes of the diffraction gratings of the liquid crystal panel disposed downstream thereof with respect to the optical path.

5. A liquid crystal projector as claimed in claim 4, and further comprising first, second and third color filter means for separating light from said light source into blue, green and red light rays having wavelengths within predetermined ranges, respectively, and wherein said at least one liquid crystal panel comprises first, second and third liquid crystal panels for modulating the blue, green and red light rays, respectively, said at least one projection lens includes first, second and third projection lenses for projecting the blue, green and red light rays modulated by the first, second and third liquid crystal panels, respectively, and said at least one anamorphic lens includes first, second and third anamorphic lenses disposed upstream of the first, second and third liquid crystal panels, respectively, the radius of curvature of one of the first, second and third anamorphic lenses being different from the corresponding radius of curvature of the others of the first, second and third anamorphic lenses.

6. A liquid crystal projector as claimed in claim 4, wherein one of the first and second electrode layers is a reflective layer, said at least one liquid crystal panel includes first, second and third liquid crystal panels, and the liquid crystal projector further comprises a color separation and light coupling means for separating light from said light source into blue, green and red light rays having wavelengths within predetermined ranges, respectively, and for optically coupling the blue, green and red light rays modulated by the first, second and third liquid crystal panels.

7. A liquid crystal projector comprising:

a light source at least one liquid crystal panel disposed downstream of the light source with respect to the optical path of the projector, each said liquid crystal panel including first and second confronting substrates at least one of which is light transmissible, first and second electrode layers disposed on confronting surfaces of the first and second substrates, respectively, and a polymer dispersion liquid crystal layer comprising liquid crystal dispersed in a polymer and sandwiched between said first and said second substrates;

at least one projection lens disposed downstream of the at least one liquid crystal panel with respect to the optical path;

at least one diaphragm disposed downstream of the at least one liquid crystal panel with respect to the optical path, each said diaphragm having an irregularly shaped opening the diameter of which varies; and at least one anamorphic lens disposed along the optical path between the light source and the at least one liquid crystal panel, wherein for each said anamorphic lens and diaphragm disposed upstream and downstream of a said liquid crystal panel with respect to the optical path, the anamorphic lens has a curvature that diffuses light transmitted along the optical path in a direction corresponding to the direction of the maximum diameter of the irregularly shaped opening of the diaphragm.

8. A liquid crystal projector as claimed in claim 7, and further comprising first, second and third color filter means for separating light from said light source into blue, green and red light rays having wavelengths within predetermined ranges, respectively, and wherein said at least one liquid crystal panel comprises first, second and third liquid crystal panels for modulating the blue, green and red light rays, respectively, the at least one projection lens includes first, second and third projection lenses for projecting the blue, green and red light rays modulated by the first, second and third liquid crystal panels, respectively, said at least one diaphragm includes first, second and third diaphragms associated with the blue, green and red light rays, respectively, the maximum diameter of the opening of one of the first, second and third irregular diaphragms being different from the maximum diameter of the opening of the others of the first, second and third diaphragms, as viewed in the respective planes parallel to the longitudinal direction of the stripes of the diffraction gratings disposed upstream of the diaphragms, respectively, and said at least one anamorphic lens includes first, second and third anamorphic lenses disposed upstream of the first, second and third liquid crystal panels, respectively, the radius of curvature of one of the first, second and third anamorphic lenses being different from the radii of curvature of the others of the first, second and third anamorphic lenses.

9. A liquid crystal projector as claimed in claim 7, wherein one of the first and second electrode layers is a reflective layer, said at least one liquid crystal panel includes first, second and third liquid crystal panels, and the liquid crystal projector further comprises a color separation and light coupling means for separating light from said light source into blue, green and red light rays having wavelengths within predetermined ranges, respectively, and for optically coupling the blue, green and red light rays modulated by the first, second and third liquid crystal panels.

10. A liquid crystal projector comprising:

a light source;

at least one liquid crystal panel disposed downstream of the light source with respect to the optical path of the projector, each said liquid crystal panel including first and second confronting substrates at least one of which is light transmissible, diffraction gratings each in the form of stripes extending along at least one of said first and said second electrode layers, first and second electrode layers disposed on confronting surfaces of the first and second substrates, respectively, and a polymer dispersion liquid crystal layer comprising liquid crystal dispersed in a polymer and sandwiched between said first and said second substrates;

at least one projection lens disposed downstream of the at least one liquid crystal panel with respect to the optical path;

at least one diaphragm disposed downstream of the at least one liquid crystal panel with respect to the optical path, each said diaphragm having an irregularly shaped opening the diameter of which varies; and at least one anamorphic lens disposed along the optical path between the light source and the at least one liquid crystal panel, wherein for each said anamorphic lens and diaphragm disposed upstream and downstream of a said liquid crystal panel with respect to the optical path, the opening of the diaphragm is elongate as viewed in a plane parallel to the longitudinal direction of the stripes of the diffraction gratings of the liquid crystal panel disposed upstream of the diaphragm, the direction of elongation of the opening as viewed in said plane extending orthogonally to the longitudinal direction of said stripes of the diffraction gratings, and the anamorphic lens has a curvature that diffuses light, transmitted along the optical path, in a direction extending orthogonally to the longitudinal direction of the stripes of the diffraction gratings of the liquid crystal panel disposed downstream thereof with respect to the optical path.

11. A liquid crystal panel comprising:

first and second confronting substrates at least one of which is light-transmissible;

first and second electrode layers formed on confronting surfaces of the first and second substrates, respectively;

a polymer dispersion liquid crystal layer comprising liquid crystals dispersed in a polymer and which is sandwiched between the first and second substrates; and diffraction gratings each having a striped pattern forming alternately disposed concavities and convexities, said gratings being disposed on at least one of the first and second electrode layers, at least the liquid crystals disposed in the concavities of the diffraction gratings being aligned in a predetermined direction without any voltage impressed between the electrode layers.

12. A liquid crystal panel as claimed in claim 11, wherein a refractive index of the diffraction gratings and a refractive index of the polymer are substantially equal to an ordinary ray refractive index of the liquid crystals.

\* \* \* \* \*